(12) United States Patent
Yu

(10) Patent No.: US 11,705,759 B2
(45) Date of Patent: Jul. 18, 2023

(54) WIRELESS CHARGING TRANSMISSION APPARATUS BY USING THREE-DIMENSIONAL (3D) POLYHEDRAL MAGNETIC RESONANCE BASED ON MULTI-ANTENNA SWITCHING

(71) Applicant: Chengdu Xpowerit Technologies Co., Ltd., Chengdu (CN)

(72) Inventor: Yiqiang Yu, Chengdu (CN)

(73) Assignee: Chengdu Xpowerit Technologies Co., Ltd., Chengdu (CN)

( * ) Notice: Subject to any disclaimer, the term of this patent is extended or adjusted under 35 U.S.C. 154(b) by 0 days.

(21) Appl. No.: 17/727,832

(22) Filed: Apr. 25, 2022

(65) Prior Publication Data
US 2023/0072782 A1 Mar. 9, 2023

(30) Foreign Application Priority Data
Sep. 7, 2021 (CN) .......................... 202111040792.1

(51) Int. Cl.
| | |
|---|---|
| *H02J 50/12* | (2016.01) |
| *H02J 50/40* | (2016.01) |
| *H02J 50/20* | (2016.01) |
| *H01Q 1/24* | (2006.01) |
| *H01Q 1/22* | (2006.01) |
| *H02J 50/90* | (2016.01) |

(52) U.S. Cl.
CPC .......... *H02J 50/12* (2016.02); *H01Q 1/2291* (2013.01); *H01Q 1/248* (2013.01); *H02J 50/20* (2016.02); *H02J 50/402* (2020.01); *H02J 50/90* (2016.02); *H02J 2207/20* (2020.01)

(58) Field of Classification Search
None
See application file for complete search history.

*Primary Examiner* — Adi Amrany
(74) *Attorney, Agent, or Firm* — Bayramoglu Law Offices LLC

(57) ABSTRACT

A wireless charging transmission apparatus by using 3D polyhedral magnetic resonance based on multi-antenna switching includes a magnetic resonance wireless energy transmitting module, a plurality of magnetic resonance transmitting antennas, a plurality of receiving antennas, and a magnetic resonance wireless energy receiving module that are connected in sequence. The magnetic resonance wireless energy transmitting module is configured to convert DC power into RF energy and control an operation mode. The magnetic resonance transmitting antennas are configured to convert the RF energy into a spatially distributed reactive field. The receiving antennas are configured to convert the reactive field into the RF energy. The magnetic resonance wireless energy receiving module is configured to convert the RF energy into DC power and charge or power a load. When one of the transmitting antennas is used as a main transmitting antenna, the rest transmitting antennas are used as relay coupling antennas.

5 Claims, 9 Drawing Sheets

WIRELESS CHARGING TRANSMISSION APPARATUS BY USING THREE-DIMENSIONAL (3D) POLYHEDRAL MAGNETIC RESONANCE BASED ON MULTI-ANTENNA SWITCHING

CROSS REFERENCE TO THE RELATED APPLICATIONS

This application is based upon and claims priority to Chinese Patent Application No. 202111040792.1, filed on Sep. 7, 2021, the entire contents of which are incorporated herein by reference.

TECHNICAL FIELD

The present invention belongs to the technical field of wireless energy transmission, and specifically relates to a wireless charging transmission apparatus by using three-dimensional (3D) polyhedral magnetic resonance based on multi-antenna switching.

BACKGROUND

With continuous development of electronic information technologies and automation control technologies, various electronic devices such as small consumer electronics, Internet of Things sensors, industrial sensors, and micro diagnostic devices are increasingly popular. However, most of such devices still rely on a wired connection between a power cable and a power socket for charging. A physical connection of a charging cable limits convenience of use of such devices, and existence of charging ports has become a design bottleneck of further miniaturization of such devices. In addition, wired charging by plugging in and unplugging plugs puts forward high requirements for waterproof and moisture-proof design of the devices, increases processing costs, and has a potential safety hazard in electricity use. Therefore, wireless charging methods have been explored for a growing number of such electronic devices. At present, there mainly have been three types of wireless charging technologies: QI standard advocated by the Wireless Power Consortium (WPC) and also called the magnetic inductive coupling technology, the magnetic resonance coupling technology advocated by the Airfuel Alliance, and the electromagnetic radiative wireless energy transmission technology. The magnetic resonance coupling technology is obviously advantageous over the magnetic inductive coupling technology in charging distance, spatial degree of freedom (DOF), one-to-many charging, and power expansion, and is more practical than the electromagnetic radiative wireless energy transmission technology in energy conversion efficiency, transmission power, and electromagnetic safety.

However, when transmitting and receiving antennas have greatly different sizes, and a charging receiver needs to be freely charged in a large 3D space, application of the magnetic resonance technology has design difficulties. For example, in an application scenario of placing a small device in a storage box for wireless charging, because a receiving antenna disposed in the device has a very small size relative to a size of the storage box, to implement real charging as required, the charged device needs to be able to maintain stable and efficient wireless charging and balanced overall energy conversion efficiency at any position and any angle in a 3D space formed by the storage box. This poses a big challenge in design of transmitting and receiving antennas in a magnetic resonance system. In another example, for a capsule endoscope used for medical diagnosis and treatment, specifically an intelligent colonoscopy capsule digestive endoscopic system, a camera disposed in a capsule is powered by a lithium battery in the capsule. Due to a small size of the capsule, the battery has a very small capacity and insufficient endurance. However, the human intestine is very long, and the capsule needs to acquire image information for a long time. Currently, the capsule endoscope can only reduce an acquisition frequency, namely, the number of images to extend an effective operation time of the endoscope. However, reducing the acquisition frequency causes the capsule to miss a real lesion area and be unable to obtain real and effective diagnosis and treatment data. Because the capsule endoscope has a long walking path in a human body and needs to be completely sealed to prevent infection, a wired connection cannot be used to recharge the capsule endoscope. Wireless charging has become the only way to extend the endurance of the capsule and increase diagnosis and treatment accuracy and reliability of the capsule. When the magnetic resonance technology is applied to the wireless charging of the capsule endoscope, there is also a technical problem in that efficient and stable wireless charging needs to be maintained at any position and any angle when transmitting and receiving antennas have greatly different sizes and the capsule needs to freely move in a 3D space formed by a human gastrointestinal system.

To resolve the foregoing technical problems, the present invention proposes a design solution of a multi-antenna switching-based 3D magnetic resonance wireless energy transmission system.

SUMMARY

An objective of the present invention is to resolve technical problems existing in design of transmitting and receiving ends when a charged device has a small size and needs to be freely charged in a large 3D space with relatively stable energy conversion efficiency in practical application of current magnetic resonance wireless energy transmission technologies. To construct a large wireless charging 3D space, a size of a transmitting antenna is large. When the charged device has the small size, the transmitting antenna and a receiving antenna have greatly different sizes. Consequently, it is difficult for the charged device to maintain a stable wireless charging effect in the 3D space formed by the transmitting antenna, and overall energy conversion efficiency significantly changes with a position and an angle. In view of the technical problem, the present invention provides a wireless charging transmission apparatus by using 3D polyhedral magnetic resonance based on multi-antenna switching.

The present invention adopts the following technical solution: A wireless charging transmission apparatus by using 3D polyhedral magnetic resonance based on multi-antenna switching includes a magnetic resonance wireless energy transmitting module, a plurality of magnetic resonance transmitting antennas, a plurality of receiving antennas, and a magnetic resonance wireless energy receiving module that are connected in sequence.

The magnetic resonance wireless energy transmitting module is configured to convert direct current (DC) power into radio frequency (RF) energy, transmit the RF energy to the magnetic resonance transmitting antennas, and control an operation mode of the wireless charging transmission apparatus.

The magnetic resonance transmitting antennas are configured to convert the RF energy into a spatially distributed reactive field.

The receiving antennas are configured to generate a magnetic resonance coupling together with the magnetic resonance transmitting antennas and convert the spatially distributed reactive field into the RF energy.

The magnetic resonance wireless energy receiving module is configured to convert the RF energy into DC power and charge or power a load.

Further, the magnetic resonance wireless energy transmitting module includes a power adapter, a voltage regulator circuit, a transmitting Bluetooth detection circuit, a frequency modulation circuit, a drive circuit, an RF power amplifier circuit, a plurality of LC matching networks, a plurality of main circuit switches, a plurality of transmitting resonant capacitors, a plurality of relay coupling capacitors, and a plurality of capacitor switching switches.

The power adapter, the voltage regulator circuit and the transmitting Bluetooth detection circuit are communicatively connected in sequence. The voltage regulator circuit is communicatively connected to the frequency modulation circuit and the RF power amplifier circuit, respectively. The frequency modulation circuit is communicatively connected to the RF power amplifier circuit through the drive circuit. The RF power amplifier circuit, the LC matching networks and the main circuit switches are communicatively connected in sequence. The main circuit switches are communicatively connected to the capacitor switching switches through the transmitting resonant capacitors and the relay coupling capacitors. The transmitting Bluetooth detection circuit is further communicatively connected to the main circuit switches and the capacitor switching switches, respectively. The capacitor switching switches are communicatively connected to the magnetic resonance transmitting antennas.

Further, the power adapter is configured to convert 220 V alternating current (AC) power to DC power and power the magnetic resonance wireless energy transmitting module.

The voltage regulator circuit is configured to regulate an input voltage.

The transmitting Bluetooth detection circuit is configured to acquire positions of the receiving antennas and control the operation mode of the wireless charging transmission apparatus, where the operation mode includes resonance matching and relay coupling matching.

The frequency modulation circuit is configured to modulate a transmitting operation frequency and convert the DC power to an RF signal.

The drive circuit is configured to drive the RF power amplifier circuit.

The RF power amplifier circuit is configured to amplify power of wireless energy.

The LC matching networks and series-parallel resonant capacitor banks are in one-to-one correspondence to the magnetic resonance transmitting antennas to form series-parallel transmitting LC resonant circuits, which are configured to determine a resonant frequency of the wireless charging transmission apparatus.

When the LC matching networks and the series-parallel resonant capacitor banks are in one-to-one correspondence to the magnetic resonance transmitting antennas to form a plurality of resonant transmitting antennas, some of the magnetic resonance transmitting antennas operate at the resonant frequency, and the rest magnetic resonance transmitting antennas are connected to the relay coupling capacitors to form a plurality of relay coupling antennas that operate at a relay coupling matching frequency.

The transmitting resonant capacitors are in one-to-one correspondence to the magnetic resonance transmitting antennas to form series LC resonant circuits, and the resonant frequency of the wireless charging transmission apparatus is controlled by adjusting parameters of the transmitting resonant capacitors.

The relay coupling capacitors are in one-to-one correspondence to the magnetic resonance transmitting antennas to form series LC relay coupling resonant circuits, and a relay coupling frequency of the wireless charging transmission apparatus is controlled by adjusting parameters of the relay coupling capacitors.

The main circuit switches are configured to switch a main RF circuit of the wireless charging transmission apparatus between on and off.

The capacitor switching switches are configured to switch between the transmitting resonant capacitors and the relay coupling capacitors.

Further, the magnetic resonance wireless energy receiving module includes a receiving resonant network, a rectifier and voltage regulator circuit, a filter circuit, a receiving Bluetooth control circuit, a power management circuit, and the load that are connected in sequence. The receiving resonant network is connected to the receiving antennas.

The receiving resonant network and the receiving antennas form a series-parallel receiving LC resonant circuit, which is configured to convert the RF energy into an AC signal.

The rectifier and voltage regulator circuit is configured to perform rectification and voltage regulation on the AC signal.

The filter circuit is configured to filter out an AC component in a pulsating DC voltage and retain a DC component to reduce a ripple coefficient of an output voltage.

The receiving Bluetooth control circuit is configured to communicate with the transmitting Bluetooth detection circuit such that the transmitting Bluetooth detection circuit controls the operation mode of the wireless charging transmission apparatus based on the positions of the receiving antennas.

The power management circuit is configured to charge or power the load.

Further, the magnetic resonance transmitting antennas are wound on an outer wall of a 3D polyhedron, and include a plurality of groups of transmitting coils and a plurality of energy feed inlets. The energy feed inlets are respectively fastened on each group of transmitting coils. Each group of transmitting coils is wound on the outer wall of the 3D polyhedron in a first winding manner, a second winding manner, or a third winding manner.

Further, in the first winding manner, the plurality of groups of transmitting coils are arranged in parallel on the outer wall of the 3D polyhedron; and each of the energy feed inlets is fastened on a transmitting coil in each group of transmitting coils.

Further, in the second winding manner, each group of transmitting coils includes a first transmitting coil and a second transmitting coil. The first transmitting coil and the second transmitting coil are arranged in parallel on the outer wall of the 3D polyhedron within a preset length, cross at a preset angle after reaching the preset length, continue to be arranged in parallel on the outer wall of the 3D polyhedron after crossing, and cross at the preset angle again after reaching a next preset length. Each of the energy feed inlets is fastened at a fold line at which the first transmitting coil and the second transmitting coil cross at the preset angle.

Further, in the third winding manner, a ferrite coating is provided on an outer surface of the 3D polyhedron; and the plurality of groups of transmitting coils are arranged in parallel on the 3D polyhedron.

Further, each of the receiving antennas includes a ferrite core, enameled wires, and an energy outlet.

The enameled wires are arranged in parallel on an outer wall of the ferrite core. The energy outlet is fastened at a bottom of the ferrite core.

The present invention has the following beneficial effects:

(1) In the present invention, there are the plurality of transmitting antennas. When one of the transmitting antennas is used as a main transmitting antenna, the rest transmitting antennas are used as relay coupling antennas. The transmitting and receiving antennas both have a 3D multilayer winding structure, but have greatly different sizes. The receiving antenna has a small size. The present invention is suitable for charging and powering micro devices that have limited endurance and do not support wired powering.

(2) The coils are wound from the bottom of the 3D polyhedron in the present invention to the side surface. The transmitting antennas may be connected in a series-parallel manner. The antennas on the sides can increase the charging vertical height, improve the charging efficiency of the edge position, and effectively increase the chargeable angle and horizontal DOF when the transmitting and receiving antennas form a specific angle.

(3) In the present invention, the ferrite magnet sheet or ferrite coating is added to the outer side of the transmitting antenna to increase the inductance of the transmitting antenna and significantly improve the transmitting efficiency.

Figure 1:
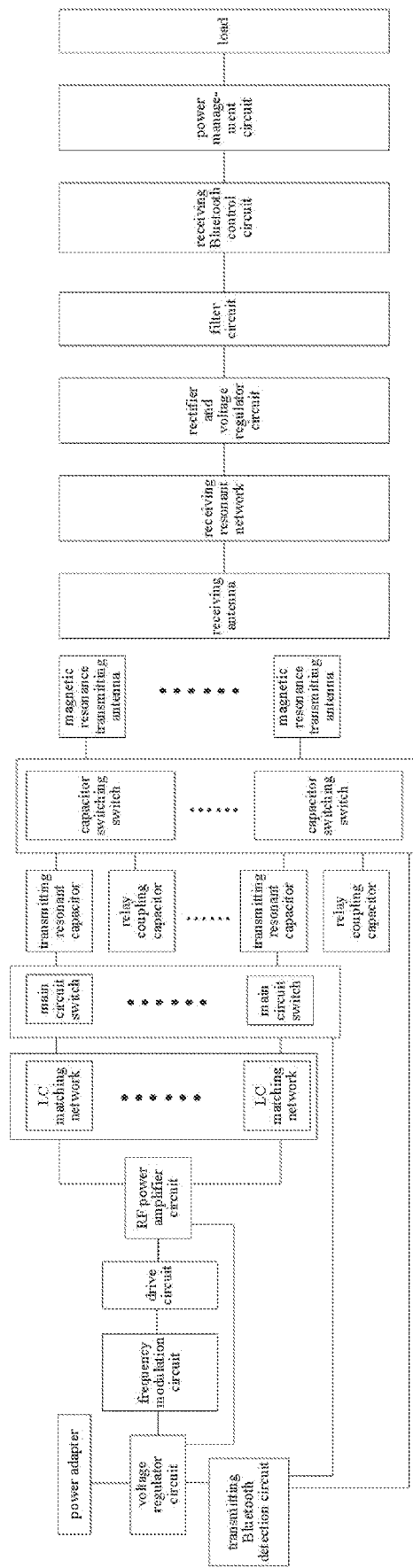
FIG. 1 is a structural diagram of a wireless charging transmission apparatus.

Reference numerals: 1-1: energy feed inlet; 1-2: first transmitting coil; 1-3: second transmitting coil; 2-1: ferrite core; 2-2: enameled wire; and 2-3: energy outlet.

DETAILED DESCRIPTION OF THE EMBODIMENTS

The following describes the embodiments of the present invention in further detail with reference to the accompanying drawings.

As shown in FIG. 1, the present invention provides a wireless charging transmission apparatus by using 3D polyhedral magnetic resonance based on multi-antenna switching, including a magnetic resonance wireless energy transmitting module, a plurality of magnetic resonance transmitting antennas, a plurality of receiving antennas, and a magnetic resonance wireless energy receiving module that are connected in sequence.

The magnetic resonance wireless energy transmitting module is configured to convert DC power into RF energy, transmit the RF energy to the magnetic resonance transmitting antennas, and control an operation mode of the wireless charging transmission apparatus.

The magnetic resonance transmitting antennas are configured to convert the RF energy into a spatially distributed reactive field.

The receiving antennas are configured to generate a magnetic resonance coupling together with the magnetic resonance transmitting antennas and convert the spatially distributed reactive field into the RF energy.

The magnetic resonance wireless energy receiving module is configured to convert the RF energy into DC power and charge or power a load.

The multi-antenna switching-based 3D wireless charging transmission apparatus uses one or more transmitting antenna switching systems to switch a transmitting and matching circuit between a transmitting resonant circuit and a relay coupling circuit based on different positions of the receiving antennas to ensure transmission efficiency and a vertical charging range of the transmitting and receiving antennas. The transmitting antennas adopt a 3D winding manner to make the receiving antennas always in a high-coupling and high-efficiency state in a 3D space. This can resolve problems existing when the receiving antennas have a planar structure, such as a large change in charging efficiency, a small charging range, and a short charging distance due to small sizes of the planar receiving antennas;

In the embodiments of the present invention, the magnetic resonance wireless energy transmitting module includes a power adapter, a voltage regulator circuit, a transmitting Bluetooth detection circuit, a frequency modulation circuit, a drive circuit, an RF power amplifier circuit, a plurality of LC matching networks, a plurality of main circuit switches, a plurality of transmitting resonant capacitors, a plurality of relay coupling capacitors, and a plurality of capacitor switching switches.

The power adapter, the voltage regulator circuit and the transmitting Bluetooth detection circuit are communicatively connected in sequence. The voltage regulator circuit is communicatively connected to the frequency modulation circuit and the RF power amplifier circuit, respectively. The frequency modulation circuit is communicatively connected to the RF power amplifier circuit through the drive circuit. The RF power amplifier circuit, the LC matching networks and the main circuit switches are communicatively connected in sequence. The main circuit switches are communicatively connected to the capacitor switching switches through the transmitting resonant capacitors and the relay coupling capacitors. The transmitting Bluetooth detection circuit is further communicatively connected to the main circuit switches and the capacitor switching switches, respectively. The capacitor switching switches are communicatively connected to the magnetic resonance transmitting antennas.

In the embodiments of the present invention, the power adapter is configured to convert 220 V AC power to DC power and power the magnetic resonance wireless energy transmitting module.

The voltage regulator circuit is configured to regulate an input voltage.

The transmitting Bluetooth detection circuit is configured to acquire positions of the receiving antennas and control the operation mode of the wireless charging transmission apparatus, where the operation mode includes resonance matching and relay coupling matching.

The frequency modulation circuit is configured to modulate a transmitting operation frequency and convert the DC power to an RF signal.

The drive circuit is configured to drive the RF power amplifier circuit.

The RF power amplifier circuit is configured to amplify power of wireless energy.

The LC matching networks and series-parallel resonant capacitor banks are in one-to-one correspondence to the magnetic resonance transmitting antennas to form series-parallel transmitting LC resonant circuits, which are configured to determine a resonant frequency of the wireless charging transmission apparatus.

When the LC matching networks and the series-parallel resonant capacitor banks are in one-to-one correspondence to the magnetic resonance transmitting antennas to form a plurality of resonant transmitting antennas, some of the magnetic resonance transmitting antennas operate at the resonant frequency, and the rest magnetic resonance transmitting antennas are connected to the relay coupling capacitors to form a plurality of relay coupling antennas that operate at a relay coupling matching frequency.

The transmitting resonant capacitors are in one-to-one correspondence to the magnetic resonance transmitting antennas to form series LC resonant circuits, and the resonant frequency of the wireless charging transmission apparatus is controlled by adjusting parameters of the transmitting resonant capacitors.

The relay coupling capacitors are in one-to-one correspondence to the magnetic resonance transmitting antennas to form series LC relay coupling resonant circuits, and a relay coupling frequency of the wireless charging transmission apparatus is controlled by adjusting parameters of the relay coupling capacitors.

The main circuit switches are configured to switch a main RF circuit of the wireless charging transmission apparatus between on and off.

The capacitor switching switches are configured to switch between the transmitting resonant capacitors and the relay coupling capacitors;

In an embodiment of the present invention, the magnetic resonance wireless energy receiving module includes a receiving resonant network, a rectifier and voltage regulator circuit, a filter circuit, a receiving Bluetooth control circuit, a power management circuit, and the load that are connected in sequence. The receiving resonant network is connected to the receiving antennas.

The receiving resonant network and the receiving antennas form a series-parallel receiving LC resonant circuit, which is configured to convert the RF energy into an AC signal.

The rectifier and voltage regulator circuit is configured to perform rectification and voltage regulation on the AC signal.

The filter circuit is configured to filter out an AC component in a pulsating DC voltage and retain a DC component to reduce a ripple coefficient of an output voltage and make the current smoother.

The receiving Bluetooth control circuit is configured to communicate with the transmitting Bluetooth detection circuit such that the transmitting Bluetooth detection circuit controls the operation mode of the wireless charging transmission apparatus based on the positions of the receiving antennas.

The power management circuit is configured to charge or power the load.

An antenna matching circuit at a receiving end involves series matching and parallel matching. When there is only a series circuit, a rectified voltage is low, and a loading capability is poor. When the parallel matching is added, the rectified voltage greatly increases, and the load capability is enhanced.

In an embodiment of the present invention, the magnetic resonance transmitting antennas are wound on an outer wall of a 3D polyhedron, and include a plurality of groups of transmitting coils and a plurality of energy feed inlets 1-1. The energy feed inlets 1-1 are respectively fastened on each group of transmitting coils. Each group of transmitting coils is wound on the outer wall of the 3D polyhedron in a first winding manner, a second winding manner, or a third winding manner.

Figure 2:
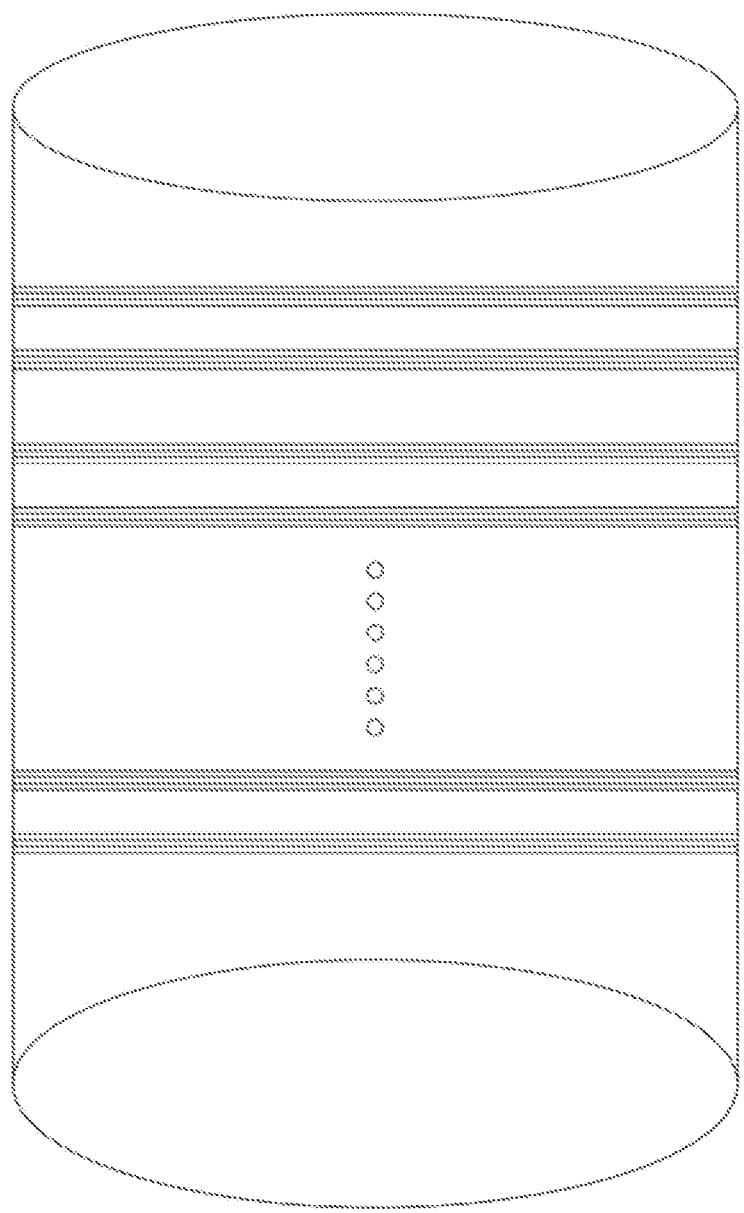
FIG. 2 is a schematic diagram of a first winding manner of transmitting antennas.
Figure 3:
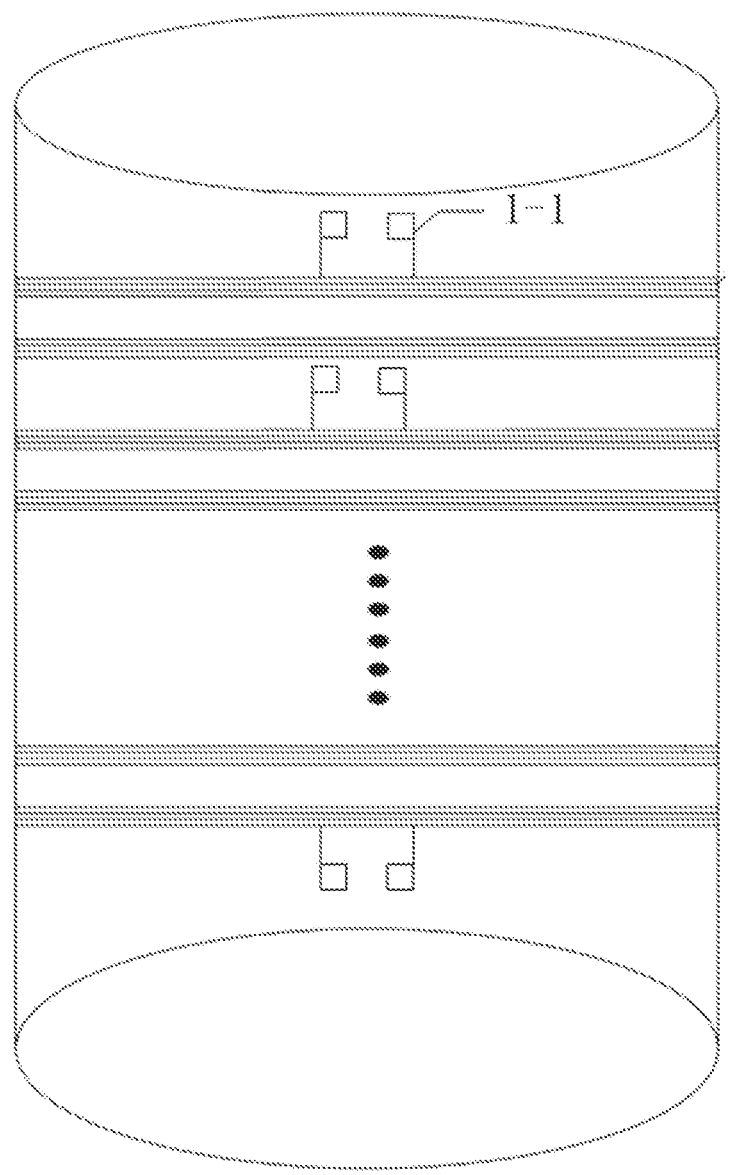
FIG. 3 is a structural diagram of a first winding manner of transmitting antennas.

In an embodiment of the present invention, as shown in FIG. 2 and FIG. 3, in the first winding manner, the plurality of groups of transmitting coils are arranged in parallel on the outer wall of the 3D polyhedron; and each of the energy feed inlets 1-1 is fastened on a transmitting coil in each group of transmitting coils.

Figure 4:
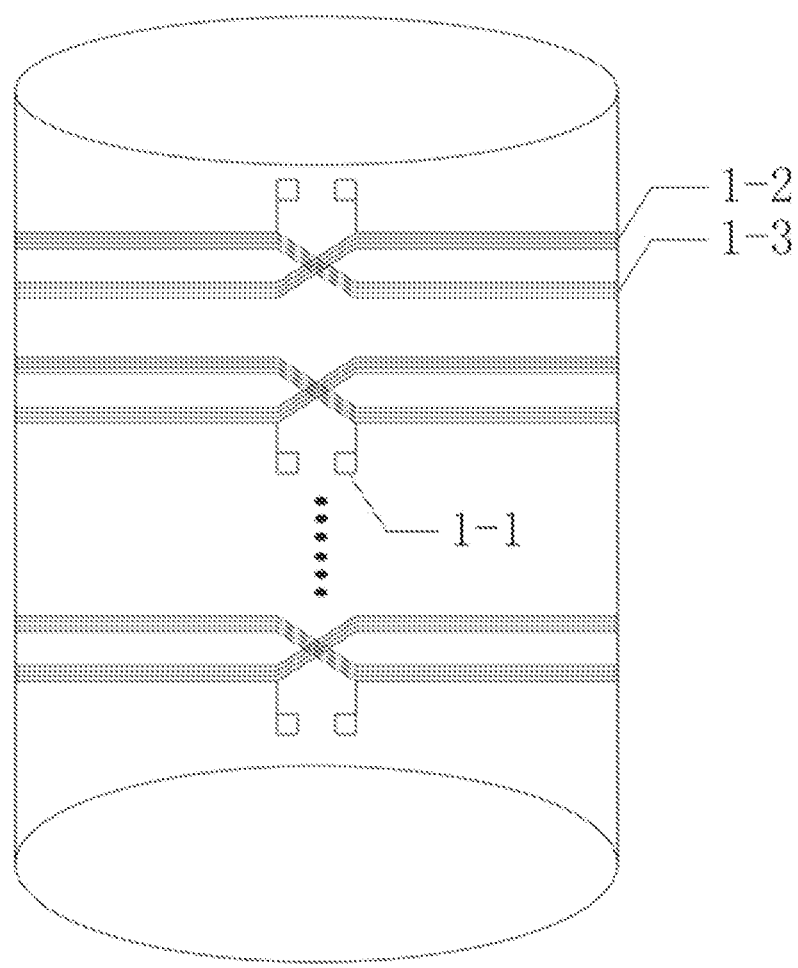
FIG. 4 is a structural diagram of a second winding manner of transmitting antennas.

In an embodiment of the present invention, as shown in FIG. 4, in the second winding manner, each group of transmitting coils includes a first transmitting coil 1-2 and a second transmitting coil 1-3. The first transmitting coil 1-2 and the second transmitting coil 1-3 are arranged in parallel on the outer wall of the 3D polyhedron within a preset length, cross at a preset angle after reaching the preset length, continue to be arranged in parallel on the outer wall of the 3D polyhedron after crossing, and cross at the preset angle again after reaching a next preset length. Each of the energy feed inlets 1-1 is fastened at a fold line at which the first transmitting coil 1-2 and the second transmitting coil 1-3 cross at the preset angle.

The plurality of transmitting antennas can all be wound in the multi-wire crossing manner. An advantage is that when a specific offset angle of the receiving antenna occurs during charging of the transmitting antennas and receiving antennas, charging current can be kept constant. This manner can increase an angle range of the receiving antenna and a vertical charging height in the space.

The advantage of the multi-wire parallel winding is that a single group of transmitting antennas is involved, the transmitting antenna is not limited to using a four-strand parallel and 3D annular winding mode, and a single group of coils is not limited to using a parallel tight winding mode. In this manner, using two independent transmitting antennas can increase efficiency by 3% but reduce an overall charging height range by 10 cm. The two transmitting antennas can form an effective vertical charging height of 19 cm. In this manner, N transmitting antennas can be used to indefinitely increase the charging height. In addition, the present invention is not limited to the foregoing two antenna structures.

Figure 5:
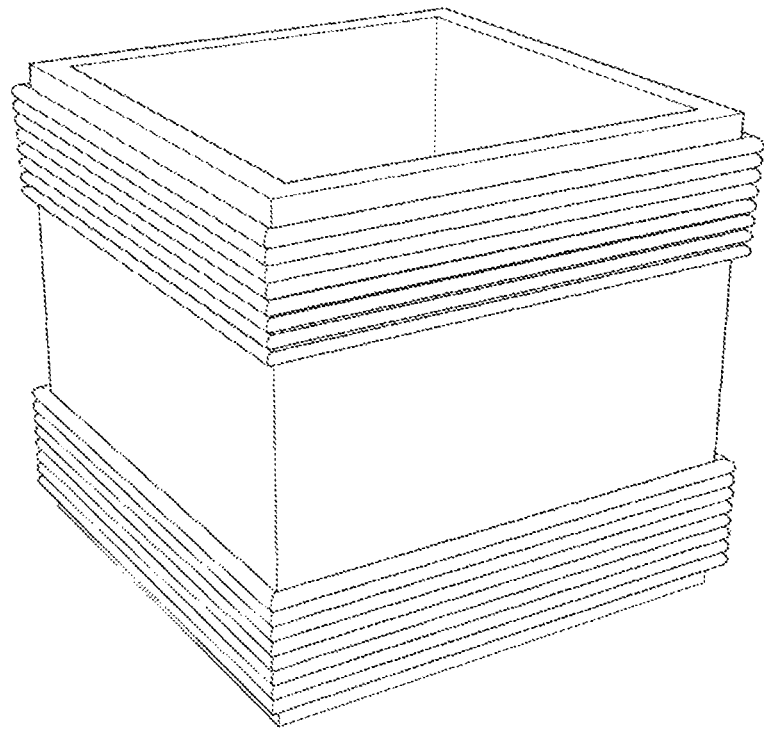
FIG. 5 is a structural diagram of a third winding manner of transmitting antennas.
Figure 6:
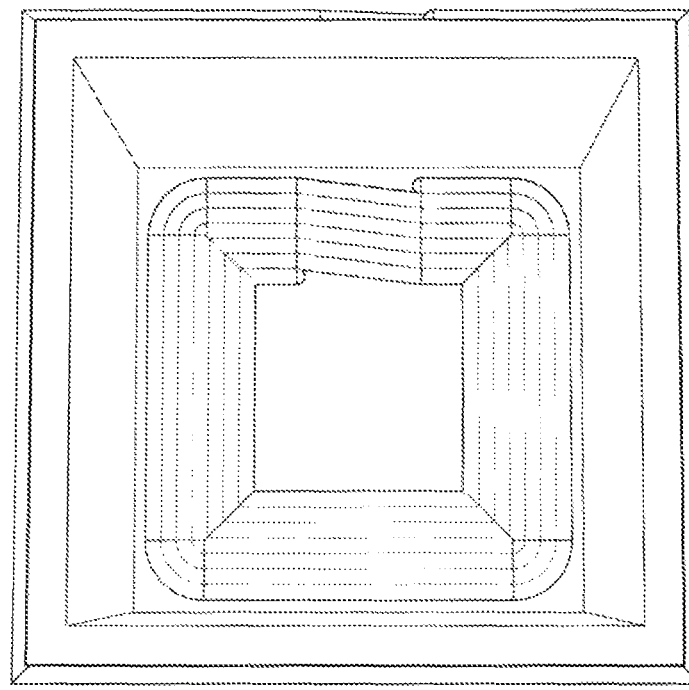
FIG. 6 is a structural diagram of a third winding manner of transmitting antennas.

In an embodiment of the present invention, as shown in FIG. 5 and FIG. 6, in the third winding manner, a ferrite coating is provided on an outer surface of the 3D polyhedron; and the plurality of groups of transmitting coils are arranged in parallel on the 3D polyhedron.

Adding ferrite on an outer side surface and an outer bottom surface of the transmitting antenna can increase an inductance and a quality factor of the transmitting antenna, so as to greatly improve charging efficiency. This manner can increase the charging efficiency and vertical height in the overall space, and a charging angle formed by the transmitting and receiving antennas to improve an overall horizontal DOF. The overall charging efficiency within the range of the transmitting antennas reaches more than 75%. Adding ferrite to the outer bottom can increase charging efficiency of a center of the 3D space, reaching more than 60%. In this case, a layer of ferrite may be added to an end with metal or both ends to shield impact of the metal on the receiving antennas.

Figure 7:
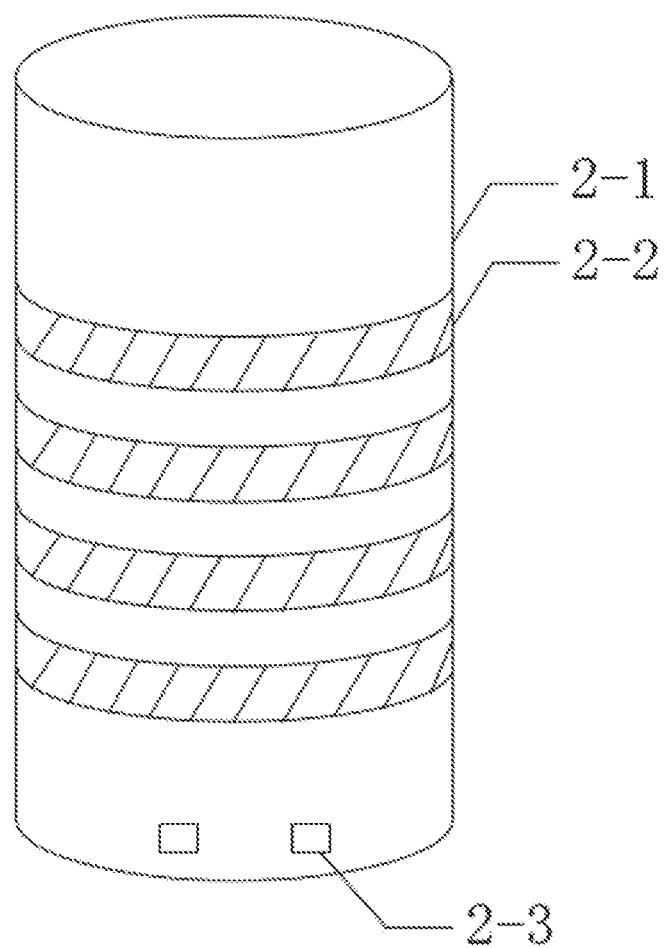
FIG. 7 is a structural diagram of a receiving antenna.

In an embodiment of the present invention, as shown in FIG. 7, each of the receiving antennas includes a ferrite core 2-1, enameled wires 2-2, and an energy outlet 2-3.

The enameled wires 2-2 are arranged in parallel on an outer wall of the ferrite core 2-1. The energy outlet 2-3 is fastened at a bottom of the ferrite core 2-1.

The ferrite core can effectively increase an inductance and a quality factor of the antenna, so as to greatly improve the charging efficiency and range. The shape and size of the core and a wire diameter and winding manner of the antenna are not limited to this manner. When various deformations occur in the transmitting antenna, a large change occurs in detected current at the power amplifier, the power amplifier adjusts a frequency or an amplitude of an excitation source. Adjusting the amplitude of the excitation source is not limited to adjusting a voltage amplitude or current amplitude. As deformations of the transmitting antenna are adjusted, adjusted efficiency is the same as efficiency before the deformations.

In an embodiment of the present invention, in a 3D polyhedral winding manner, coils are wound from the outer bottom of the 3D polyhedron to the outer side surface of the 3D polyhedron. The transmitting antennas may be connected in a series-parallel manner, similar to a hexahedron with antennas on five sides. Regular polyhedron and irregular polyhedron are suitable for this solution. The antennas at the bottom can increase the charging efficiency of the center in the 3D space, and the antennas on the sides can increase the vertical charging height, improve charging efficiency of an edge position, and keep the charging efficiency constant after the transmitting and receiving antennas form an angle. That the receiving antenna uses the core surface winding manner can effectively resolve a situation that the antenna has few turns and a low inductance and quality factor. In this manner, the receiving antenna can be miniaturized, the vertical charging height within the 3D space is high, and the charging efficiency keeps constant when the transmitting and receiving antennas form an angle. This manner resolves problems that the receiving antenna cannot be miniaturized and is inconvenient to be built in practical scenarios, and a variable charging angle between the transmitting and receiving antennas is small when the receiving antenna has a planar structure.

As shown in FIG. 1, the present invention provides a wireless charging transmission apparatus to implement wireless energy transmission based on the position of the receiving antenna detected by the transmitting antenna, and charge or power the load. In the multi-antenna switching-based 3D wireless charging transmission system, there may be one or N transmitting antennas. When one of the transmitting antennas operates at the transmitting resonant frequency, the rest transmitting antennas operate at the relay coupling frequency. Two or more transmitting antennas operate at the transmitting resonant and relay coupling frequencies.

The one or N transmitting antennas operate at the transmitting resonance matching frequency and relay coupling matching frequency. When one of the transmitting antennas operates at the transmitting resonant frequency, the rest transmitting antennas operate at the relay coupling frequency. Therefore, the one or N transmitting antennas can simultaneously operate to make the receiving antenna within different vertical ranges of the transmitting antennas. The transmitting antenna can selectively operate at the transmitting resonant capacitor frequency or relay coupling capacitor frequency based on the position of the receiving antenna to ensure the transmission efficiency of the transmitting antenna and the receiving antenna, and ensure that the receiving antenna can ensure uninterrupted power supply at any position within the range of the transmitting antenna when the receiving antenna is in a human body. Because the one or N transmitting antennas operate at different frequencies, when one of the transmitting antennas operates at the transmitting resonant frequency, the rest transmitting antennas operate at the relay coupling frequency, causing interference of two or N transmitting antennas to each other to be very small and not affect each other's normal operation.

When one of the transmitting antennas uses the transmitting resonant capacitor, the rest transmitting antennas use the relay coupling capacitor. In this case, except that the transmitting antenna involved in the transmitting resonant circuit uses the transmitting resonant capacitor, the main circuit switches and transmitting resonant capacitor switching switches for the rest transmitting antennas are opened, and the relay coupling capacitor and capacitor switching switch form the relay coupling circuit together with the magnetic resonance transmitting antenna N.

As shown in FIG. 2, in this embodiment, a single group of transmitting antennas is involved, the transmitting antenna is not limited to using the four-strand parallel and 3D annular winding mode, and a single group of coils is not limited to using the parallel tight winding mode. In the present invention, using two independent transmitting antennas can increase the efficiency by 3% but reduce the overall charging height range by 10 cm in comparison with the cross-winding manner. The two transmitting antennas form an effective vertical charging height of 19 cm. In this manner, N antennas can be used to indefinitely increase the charging height.

As shown in FIG. 3, in this embodiment, a single group of transmitting antennas is involved, the transmitting antenna is not limited to using the four-strand parallel and 3D annular winding mode, and each independent group of coils is provided with the energy feed inlet 1-1. The wire diameter of the transmitting antenna, the parallel connection manner of the wire, and the winding manner are not fixed, and there may be various combinations in practical application.

As shown in FIG. 4, the structure and size of the transmitting antenna in this embodiment are not fixed, the circumference of the 3D multi-antenna polyhedron is 110 cm, the effective vertical charging range is 29 cm, the spacing between the first transmitting coil 1-2 and the second transmitting coil 1-3 is 6.5 cm, the parallel distance after crossing of each transmitting antenna is 2.5 cm, and the overall width of each antenna is 3.5 cm. These dimensions may not be fixed and can be flexibly changed as needed, and there are one or more transmitting antennas. Each transmitting antenna is provided with an energy feed inlet. There is a same symmetrical intersection point at a position on the back side and opposite to the position of the intersection point of each antenna. In the present invention, the angle at the antenna intersection point is 30°. This angle is not fixed and can be large or small as needed.

The parallel distance between two antennas is 2.5 cm but not limited to this distance. The distance between two independent antennas is 6 cm but not limited to this distance. The same applies to N antennas. Two antennas intersect in parallel, and two intersection centrosymmetric points at this position is at a thirty-degree angle. This can keep the charging current constant when the receiving antenna has a specific offset angle less than or equal to 60° during charging of the transmitting and receiving antennas. This angle can be increased to 90° based on the adjustment of the transmitting and receiving antennas. This manner can increase the angle range of the receiving antenna, and using two independent transmitting antennas can form a vertical charging height of up to 29 cm. N transmitting antennas can be used to indefinitely increase the charging height.

As shown in FIG. 5, the 3D polyhedron has a square opening, and may alternatively be a 3D sphere, a 3D irregular polyhedron, a regular polyhedron, or the like. Those of ordinary skill in the art may obtain a 3D polyhedron with a square opening and fully applicable to the present solution according to the technical teachings disclosed in the present invention.

FIG. 6 is a two-dimensional diagram of a box with a square opening.

FIG. 7 is a diagram of the magnetic resonance wireless energy receiving antenna in this embodiment. The receiving antenna has a 3D cylindrical multilayer tight winding structure. In the figure, the white part represents the ferrite core, and a layer of black material on an upper surface represents a shielding material. In practical application, the shielding material fully covers one end or both ends of the receiving antenna. In the present invention, the transmitting antenna is obtained by winding an enameled wire on a surface of a cylindrical magnetic core, and it is found that the magnetic core can effectively increase an inductance and a quality factor of the antenna, so as to greatly improve the charging efficiency and range. An appropriate magnetic core can be selected as required. The shape and size of the core and a wire diameter and winding manner of the antenna are not fixed. Increasing the diameter and length of the magnetic core and the wire diameter of the transmitting antenna can effectively increase the charging efficiency and horizontal DOF.

Figure 8:
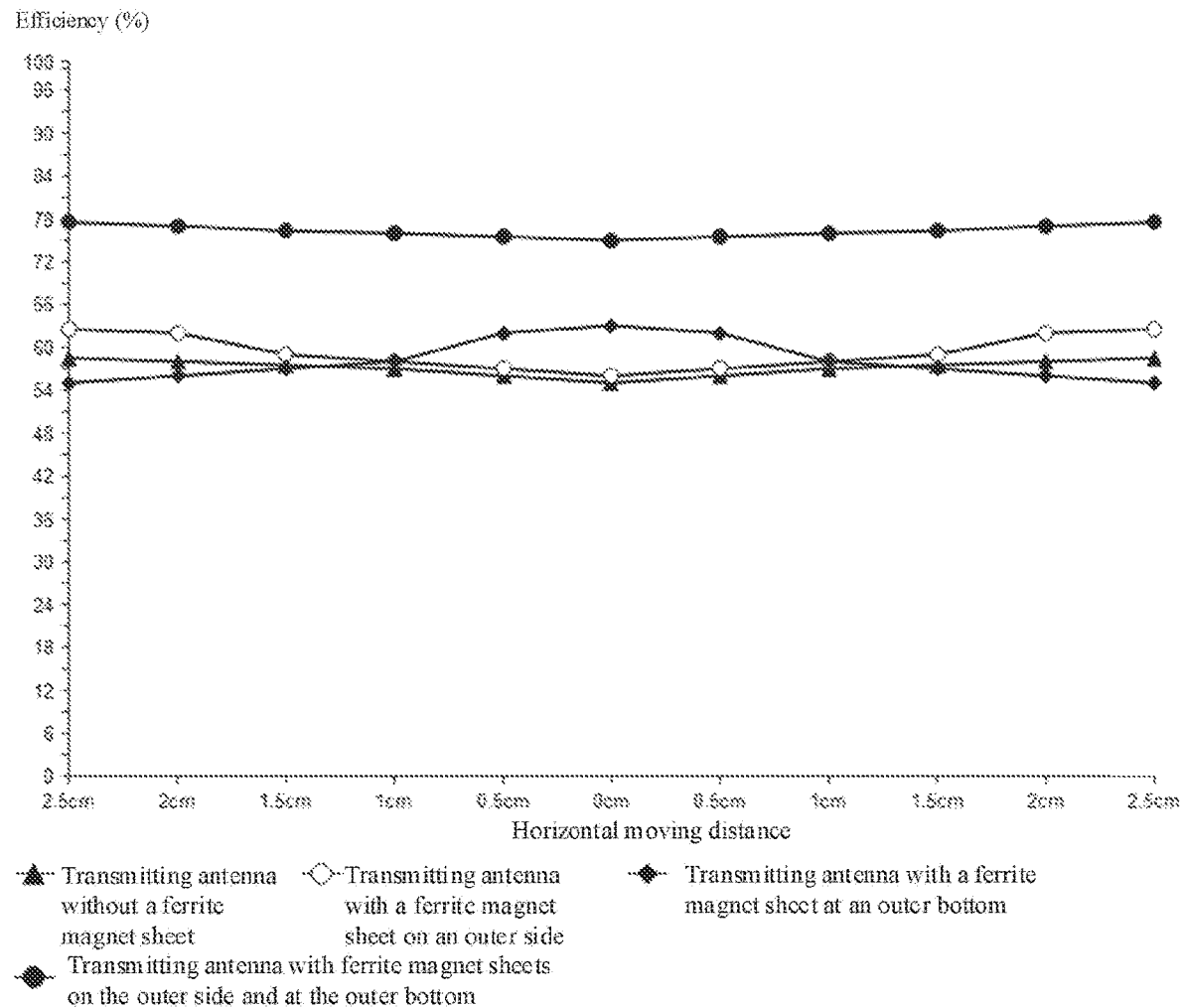
FIG. 8 is a comparison diagram of efficiency changes of a transmitting antenna with and without ferrite magnet sheets on an outer side and at an outer bottom.

FIG. 8 compares efficiency changes of a transmitting antenna with and without ferrite magnet sheets on an outer side and at an outer bottom. The x-axis represents a horizontal charging distance extending from a central position of a 3D polyhedron to both sides, and the y-axis represents efficiency (%). When no ferrite is added, an overall charging efficiency of a drain is the lowest, and the efficiency gradually increases as the charging position moves from the middle to the edge. Overall efficiency of the drain when a ferrite magnet sheet or ferrite magnet coating is added is 20% higher than that when no ferrite magnet is added, and the efficiency gradually increases as the charging position moves from the middle to the edge.

Figure 9:
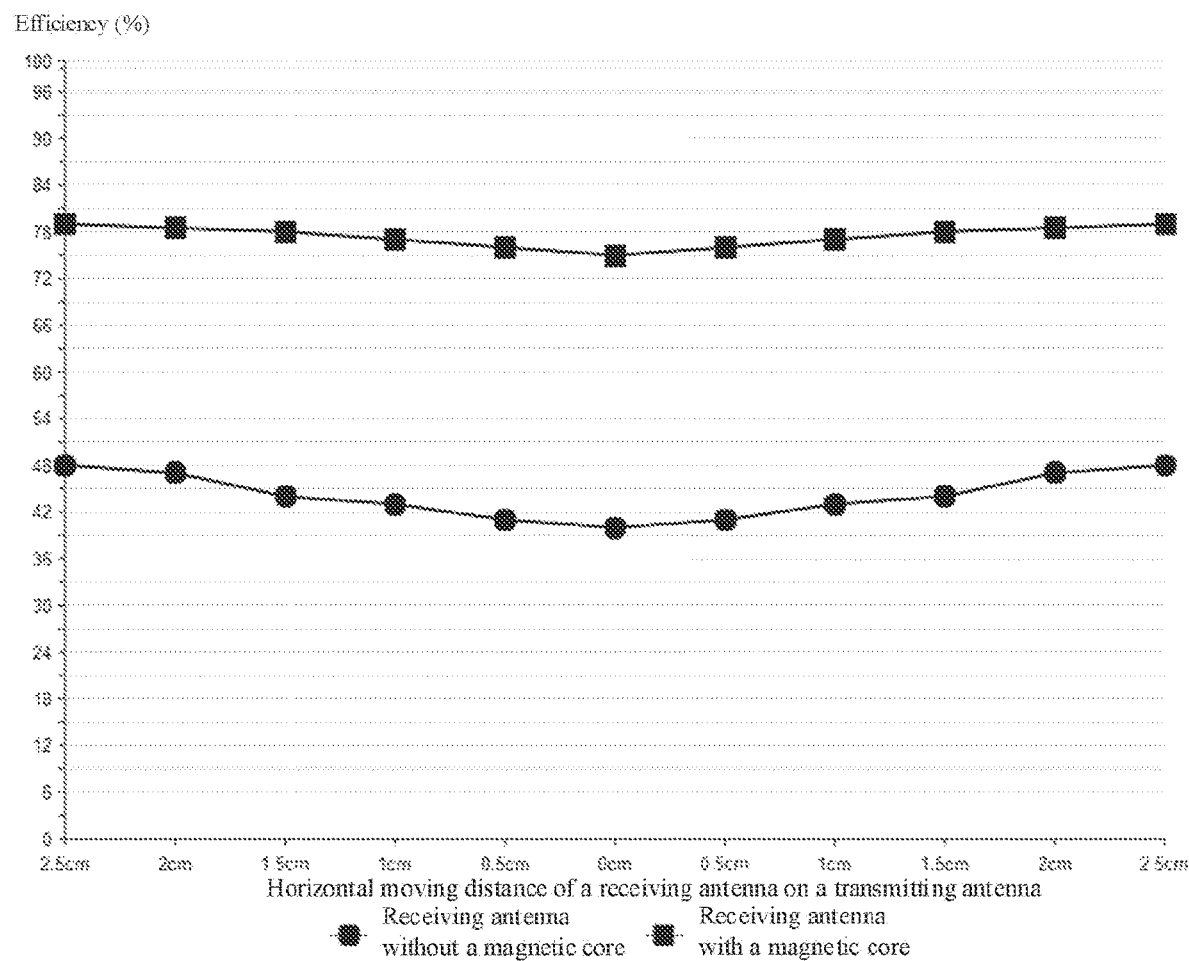
FIG. 9 is a diagram of relationships between position changes and efficiency of a receiving antenna with and without a magnetic core.

FIG. 9 shows relationships between position changes and efficiency of a receiving antenna in a 3D wireless charging transmission device with and without a magnetic core. Efficiency when no magnetic core is added is the lowest, and efficiency when the magnetic core is added is the highest.

Figure 10:
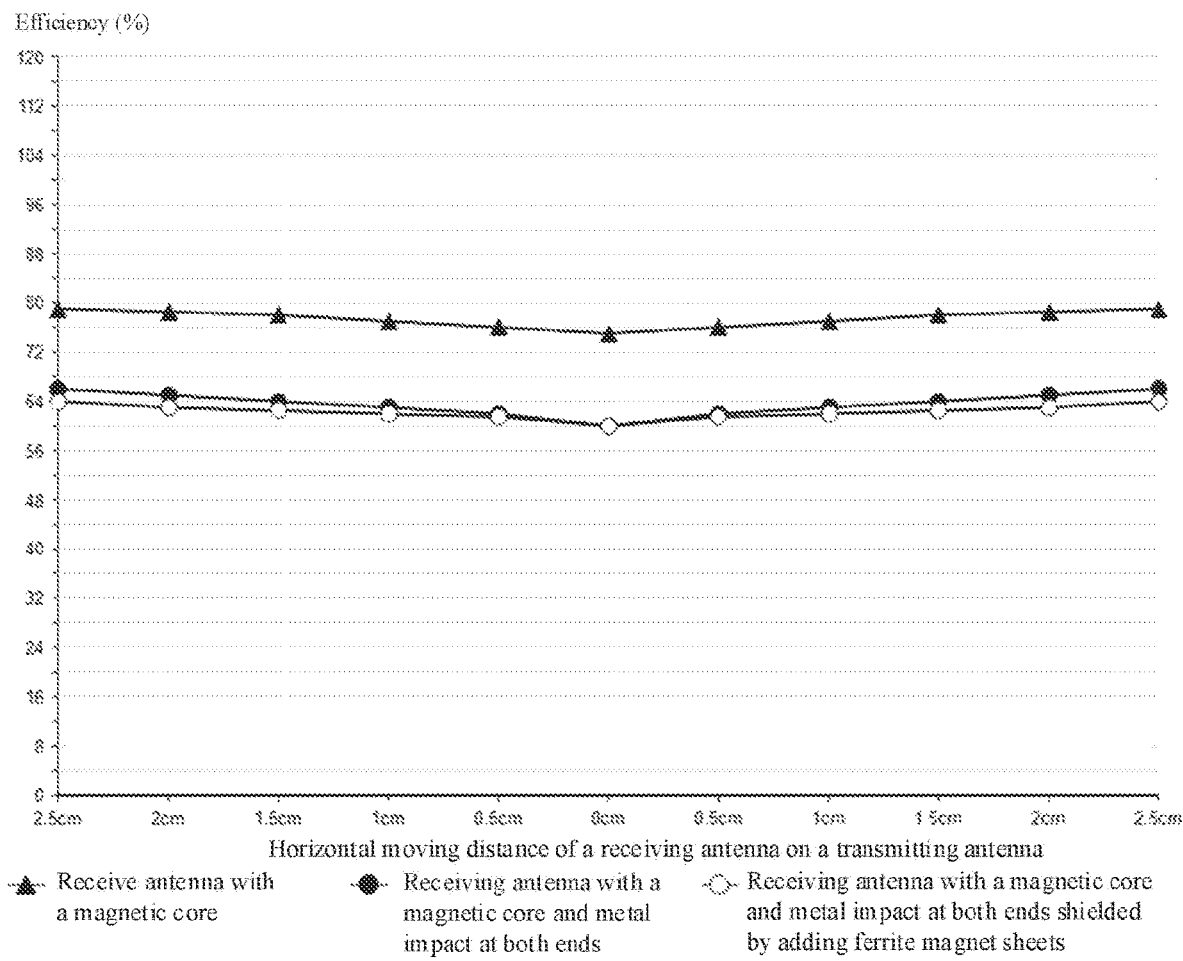
FIG. 10 is a diagram of relationships between position changes and efficiency when there is metal at one end or both ends of a receiving antenna.

As shown in FIG. 10, when there are metal materials at both ends, the efficiency decreases more. When the metal has impact on both ends of the receiving antenna, ferrite magnet sheets at both ends shield the impact. When the metal material is close to one end or both ends of the receiving antenna, the inductance and Q quality factor of the receiving antenna decrease. A layer of ferrite can be added to shield the impact of the metal on the receiving antenna. Adding a shielding material cannot completely shield the impact of the metal, and the ferrite magnet sheet is equivalent to another metal. As shown in FIG. 10, the efficiency of the receiving antenna when there is no metal impact is higher than that when there is metal impact on both ends.

In the present invention, the position of the receiving antenna within the range of the transmitting antennas needs to be monitored in real time, and based on different operation frequencies of two transmitting antennas, when one of the transmitting antennas is used for transmission, the rest transmitting antenna or N transmitting antennas are used as relay antennas. An operating principle and process are as follows: In the present invention, the two transmitting antennas in the system need to simultaneously operate; the two transmitting antennas have different functions, where one of the transmitting antennas is used for wireless energy transmission, and the rest transmitting antenna is used as a relay coupling antenna to stretch and extend a magnetic field of the transmitting antenna to increase a vertical charging distance, ensuring that the charging efficiency remains constant.

The operating principle and process of the present invention are as follows: When the power adapter is connected to power on the whole circuit, the magnetic resonance wireless charging transmission apparatus starts to operate, and the transmitting Bluetooth detection circuit is used to control the matching switching switch and antenna switching switch for dual-antenna switching scanning. When the rectified voltage equivalent value at the position of the receiving antenna acquired when the transmitting Bluetooth detection circuit communicates with the receiving Bluetooth detection circuit is beyond a range of a preset threshold, the position of the receiving antenna is determined, the magnetic resonance transmitting antenna is first controlled to be turned on, and then the transmitting antenna in the area in which the receiving antenna is located is turned on. Next, the relay antenna is turned on. When the receiving input is stable, the receiving Bluetooth detection circuit turns on the power management circuit to power the load. When the position of the receiving antenna changes, and the rectified voltage equivalent value at the position of the receiving antenna is beyond the range of the preset threshold, a charging flow returns to the dual-antenna switching scanning state, the position of the receiving antenna is determined through rescanning, and a new charging flow is entered. When the power amplified Bluetooth acquires a large change in the current at the power amplifier when the magnetic resonance transmitting antenna is deformed, the Bluetooth control circuit opens the matching switching switch and antenna switching switch. At this time, the charging flow returns to the dual-antenna switching scanning state, the position of the receiving antenna is determined through rescanning, and a new charging flow is entered.

The transmitting and receiving antennas have great differences. The receiving antenna has a small size and requires a high vertical charging height. The receiving antenna has a wide range of movement within the range of the transmitting antenna. It can be ensured that the charging efficiency remains constant when there is an angle between the transmitting and receiving antennas. The charging DOF needs to be high. The transmitting and receiving antennas need to have a 3D structure. The load can be better charged or powered.

The present invention has the following beneficial effects:

(1) In the present invention, there are the plurality of transmitting antennas. When one of the transmitting antennas is used as a main transmitting antenna, the rest transmitting antennas are used as relay coupling antennas. The transmitting and receiving antennas both have a 3D multilayer winding structure, but have greatly different sizes. The receiving antenna has a small size. The present invention is suitable for charging and powering micro devices that have limited endurance and do not support wired powering.

(2) The coils are wound from the bottom of the 3D polyhedron in the present invention to the side surface. The transmitting antennas may be connected in a series-parallel manner. The antennas on the sides can increase the charging vertical height, improve the charging efficiency of the edge position, and effectively increase the chargeable angle and horizontal DOF when the transmitting and receiving antennas form a specific angle.

(3) In the present invention, the ferrite magnet sheet or ferrite coating is added to the outer side of the transmitting antenna to increase the inductance of the transmitting antenna and significantly improve the transmitting efficiency.

Those of ordinary skill in the art will understand that the embodiments described herein are intended to help readers understand the principles of the present invention, and it should be understood that the protection scope of the present invention is not limited to such special statements and embodiments. Those of ordinary skill in the art may make other various specific modifications and combinations according to the technical teachings disclosed in the present invention without departing from the essence of the present invention, and such modifications and combinations still fall within the protection scope of the present invention.

What is claimed is:

1. A wireless charging transmission apparatus by using three-dimensional (3D) polyhedral magnetic resonance based on multi-antenna switching, comprising a magnetic resonance wireless energy transmitting module, a plurality of magnetic resonance transmitting antennas, a plurality of receiving antennas, and a magnetic resonance wireless energy receiving module, wherein the magnetic resonance wireless energy transmitting module, the plurality of magnetic resonance transmitting antennas, the plurality of receiving antennas, and the magnetic resonance wireless energy receiving module are connected in sequence; wherein the magnetic resonance wireless energy transmitting module is configured to convert direct current (DC) power into radio frequency (RF) energy, transmit the RF energy to the plurality of magnetic resonance transmitting antennas, and control an operation mode of the wireless charging transmission apparatus;

the plurality of magnetic resonance transmitting antennas are configured to convert the RF energy into a spatially distributed reactive field;

the plurality of receiving antennas are configured to generate a magnetic resonance coupling together with the plurality of magnetic resonance transmitting antennas and convert the spatially distributed reactive field into the RF energy;

the magnetic resonance wireless energy receiving module is configured to convert the RF energy into DC power and charge or power a load;

the magnetic resonance wireless energy transmitting module comprises a power adapter, a voltage regulator circuit, a transmitting Bluetooth detection circuit, a frequency modulation circuit, a drive circuit, an RF power amplifier circuit, a plurality of LC matching networks, a plurality of main circuit switches, a plurality of transmitting resonant capacitors, a plurality of relay coupling capacitors, and a plurality of capacitor switching switches;

the power adapter, the voltage regulator circuit and the transmitting Bluetooth detection circuit are communicatively connected in sequence; the voltage regulator circuit is communicatively connected to the frequency modulation circuit and the RF power amplifier circuit, respectively; the frequency modulation circuit is communicatively connected to the RF power amplifier circuit through the drive circuit; the RF power amplifier circuit, the plurality of LC matching networks, and the plurality of main circuit switches are communicatively connected in sequence; the plurality of main circuit switches are communicatively connected to the plurality of capacitor switching switches through the plurality of transmitting resonant capacitors and the plurality of relay coupling capacitors; the transmitting Bluetooth detection circuit is further communicatively connected to the plurality of main circuit switches and the plurality of capacitor switching switches, respectively; and the plurality of capacitor switching switches are communicatively connected to the plurality of magnetic resonance transmitting antennas;

the power adapter is configured to convert 220 V alternating current (AC) power to DC power and power the magnetic resonance wireless energy transmitting module;

the voltage regulator circuit is configured to regulate an input voltage;

the transmitting Bluetooth detection circuit is configured to acquire positions of the plurality of receiving antennas and control the operation mode of the wireless charging transmission apparatus, wherein the operation mode comprises resonance matching and relay coupling matching;

the frequency modulation circuit is configured to modulate a transmitting operation frequency and convert the DC power to an RF signal;

the drive circuit is configured to drive the RF power amplifier circuit;

the RF power amplifier circuit is configured to amplify power of wireless energy;

the plurality of LC matching networks and series-parallel resonant capacitor banks are in one-to-one correspondence to the plurality of magnetic resonance transmitting antennas to form series-parallel transmitting LC resonant circuits, wherein the series-parallel transmitting LC resonant circuits are configured to determine a resonant frequency of the wireless charging transmission apparatus;

when the plurality of LC matching networks and the series-parallel resonant capacitor banks are in one-to-one correspondence to the plurality of magnetic resonance transmitting antennas to form a plurality of resonant transmitting antennas, some of the plurality of magnetic resonance transmitting antennas operate at the resonant frequency, and the rest magnetic resonance transmitting antennas are connected to the plurality of relay coupling capacitors to form a plurality of relay coupling antennas, wherein the plurality of relay coupling antennas operate at a relay coupling frequency;

the plurality of transmitting resonant capacitors are in one-to-one correspondence to the plurality of magnetic resonance transmitting antennas to form series LC resonant circuits, and the resonant frequency of the wireless charging transmission apparatus is controlled by adjusting parameters of the plurality of transmitting resonant capacitors;

the plurality of relay coupling capacitors are in one-to-one correspondence to the plurality of magnetic resonance transmitting antennas to form series LC relay coupling resonant circuits, and the relay coupling frequency of the wireless charging transmission apparatus is controlled by adjusting parameters of the plurality of relay coupling capacitors;

the plurality of main circuit switches are configured to switch a main RF circuit of the wireless charging transmission apparatus between on and off;

the plurality of capacitor switching switches are configured to switch between the plurality of transmitting resonant capacitors and the plurality of relay coupling capacitors;

the plurality of magnetic resonance transmitting antennas are wound on an outer wall of a 3D polyhedron, and comprise a plurality of groups of transmitting coils and a plurality of energy feed inlets; the plurality of energy feed inlets are respectively fastened on each group of transmitting coils of the plurality of groups of transmitting coils; and each group of transmitting coils is wound on the outer wall of the 3D polyhedron in a first winding manner, a second winding manner, or a third winding manner; and in the second winding manner, each group of transmitting coils comprises a first transmitting coil and a second transmitting coil, and the first transmitting coil and the second transmitting coil are arranged in parallel on the outer wall of the 3D polyhedron within a preset length, cross at a preset angle after reaching the preset length, continue to be arranged in parallel on the outer wall of the 3D polyhedron after crossing, and cross at the preset angle again after reaching a next preset length; and each of the plurality of energy feed inlets is fastened at a fold line, wherein the first transmitting coil and the second transmitting coil cross at the preset angle at the fold line.

2. The wireless charging transmission apparatus by using 3D polyhedral magnetic resonance based on multi-antenna switching according to claim 1, wherein the magnetic resonance wireless energy receiving module comprises a receiving resonant network, a rectifier and voltage regulator circuit, a filter circuit, a receiving Bluetooth control circuit, a power management circuit, and the load, wherein the receiving resonant network, the rectifier and voltage regulator circuit, the filter circuit, the receiving Bluetooth control circuit, the power management circuit, and the load are connected in sequence; and the receiving resonant network is connected to the plurality of receiving antennas;

the receiving resonant network and the plurality of receiving antennas form a series-parallel receiving LC resonant circuit, wherein the series-parallel receiving LC resonant circuit is configured to convert the RF energy into an AC signal;

the rectifier and voltage regulator circuit is configured to perform rectification and voltage regulation on the AC signal;

the filter circuit is configured to filter out an AC component in a pulsating DC voltage and retain a DC component to reduce a ripple coefficient of an output voltage;

the receiving Bluetooth control circuit is configured to communicate with the transmitting Bluetooth detection circuit, wherein the transmitting Bluetooth detection circuit controls the operation mode of the wireless charging transmission apparatus based on the positions of the plurality of receiving antennas; and the power management circuit is configured to charge or power the load.

3. The wireless charging transmission apparatus by using 3D polyhedral magnetic resonance based on multi-antenna switching according to claim 1, wherein in the first winding manner, the plurality of groups of transmitting coils are arranged in parallel on the outer wall of the 3D polyhedron; and each of the plurality of energy feed inlets is fastened on a transmitting coil in each group of transmitting coils.

4. The wireless charging transmission apparatus by using 3D polyhedral magnetic resonance based on multi-antenna switching according to claim 1, wherein in the third winding manner, a ferrite coating is provided on an outer surface of the 3D polyhedron; and the plurality of groups of transmitting coils are arranged in parallel on the 3D polyhedron.

5. The wireless charging transmission apparatus by using 3D polyhedral magnetic resonance based on multi-antenna switching according to claim 1, wherein each of the plurality of receiving antennas comprises a ferrite core, enameled wires, and an energy outlet; and the enameled wires are arranged in parallel on an outer wall of the ferrite core; and the energy outlet is fastened at a bottom of the ferrite core.

* * * * *